United States Patent [19]

Stirling

[11] Patent Number: 5,678,885
[45] Date of Patent: Oct. 21, 1997

[54] VEHICLE BODY CONSTRUCTION

[76] Inventor: Leroy D. Stirling, 38 Cecil Street Box 627, Ridgetown, Ontario, Canada, N0P 2C0

[21] Appl. No.: 517,560

[22] Filed: Aug. 21, 1995

[51] Int. Cl.[6] .................................................. B62D 39/00
[52] U.S. Cl. ...................... 296/185; 296/37.1; 293/110; 293/137; 180/326
[58] Field of Search .................... 296/37.1, 185; 293/110, 137, 109, 135, 136; 180/326; 280/752

[56] References Cited

U.S. PATENT DOCUMENTS

| | | | |
|---|---|---|---|
| 1,490,657 | 4/1924 | Botella | 296/37.1 |
| 2,091,057 | 8/1937 | Straith | 280/752 |
| 3,782,768 | 1/1974 | Moore | 293/110 |
| 3,975,006 | 8/1976 | Peterson | 293/137 X |
| 4,392,546 | 7/1983 | Brown et al. | 180/326 |
| 4,592,580 | 6/1986 | Stanganelli et al. | 293/136 |
| 5,341,895 | 8/1994 | Grinberg et al. | 180/326 |
| 5,431,463 | 7/1995 | Chou | 293/110 |

FOREIGN PATENT DOCUMENTS

| | | | |
|---|---|---|---|
| 1272962 | 8/1961 | France | 296/185 |
| 2689478 | 10/1993 | France | 296/185 |
| 854016 | 10/1952 | Germany | 296/185 |
| 5278631 | 10/1993 | Japan | 296/185 |
| 2265117 | 9/1993 | United Kingdom | 293/109 |

*Primary Examiner*—Dennis H. Pedder
*Attorney, Agent, or Firm*—Zarley, McKee, Thomte, Voorhees, & Sease

[57] ABSTRACT

A vehicle body includes a collapsible nose at the front. Behind the collapsible nose is a motor compartment, and behind the motor compartment is a luggage compartment. The passenger compartment is located rearwardly of the collapsible nose, the engine compartment, and the luggage compartment. The driver's seat is located adjacent the rear of the vehicle.

10 Claims, 7 Drawing Sheets

VEHICLE BODY CONSTRUCTION

BACKGROUND OF THE INVENTION

The present invention relates to an improved vehicle body construction.

Safety is a primary concern in the construction of vehicle bodies. The vehicle bodies must be constructed in such a manner that they minimize injury to passengers during collisions.

Many present vehicle constructions include an engine compartment in front of the passengers, but do not include other space which can collapse during a head-on collision before causing injury to the passengers.

Therefore, a primary object of the present invention is the provision of an improved vehicle construction.

A further object of the present invention is the provision of an improved vehicle construction which provides more safety for the passengers than prior vehicle constructions.

A further object of the present invention is the provision of an improved vehicle construction which provides at least two collapsible compartments in front of the passengers so as to provide protection for the passengers in the event of a head-on collision.

A further object of the present invention is the provision of an improved vehicle construction which places the driver at the rear of the vehicle rather than the front of the vehicle as in present designs.

A further object of the present invention is the provision of an improved vehicle construction which includes a collapsible nose construction for absorbing head-on collisions.

A further object of the present invention is the provision of an improved vehicle construction which provides a protective bumper surrounding the entire vehicle so as to protect the passengers from collisions from any direction.

A further object of the present invention is the provision of an improved vehicle construction which includes a collapsible control panel or dash which is also adjustable as to height and angle.

A further object of the present invention is the provision of an improved vehicle construction which is economical to manufacture, durable in use and efficient in operation.

SUMMARY OF THE INVENTION

The foregoing objects may be achieved by a vehicle comprising a vehicle frame and a plurality of wheels rotatable mounted to the frame and adapted to support the frame above a supporting surface. A vehicle body is mounted on the frame and includes a longitudinal axis, a front end and a rear end. A collapsible nose is provided at the front end of the vehicle body. A first panel is spaced rearwardly from the collapsible nose to form an engine compartment between the nose and the first panel. An engine is within the engine compartment and is drivingly connected to at least some of the wheels.

A second panel is spaced rearwardly from the first panel and forms a luggage compartment therebetween. A passenger compartment is enclosed within the body rearwardly of the second panel so that the collapsible nose, the engine compartment and the luggage compartment are positioned forwardly from the passenger compartment.

An additional feature of the present invention is the provision of the driver's seat adjacent the rear of the vehicle so as to improve safety to the driver over present constructions which use the driver's seat adjacent the front of the vehicle.

DETAILED DESCRIPTION OF THE PREFERRED EMBODIMENT

Figure 3:
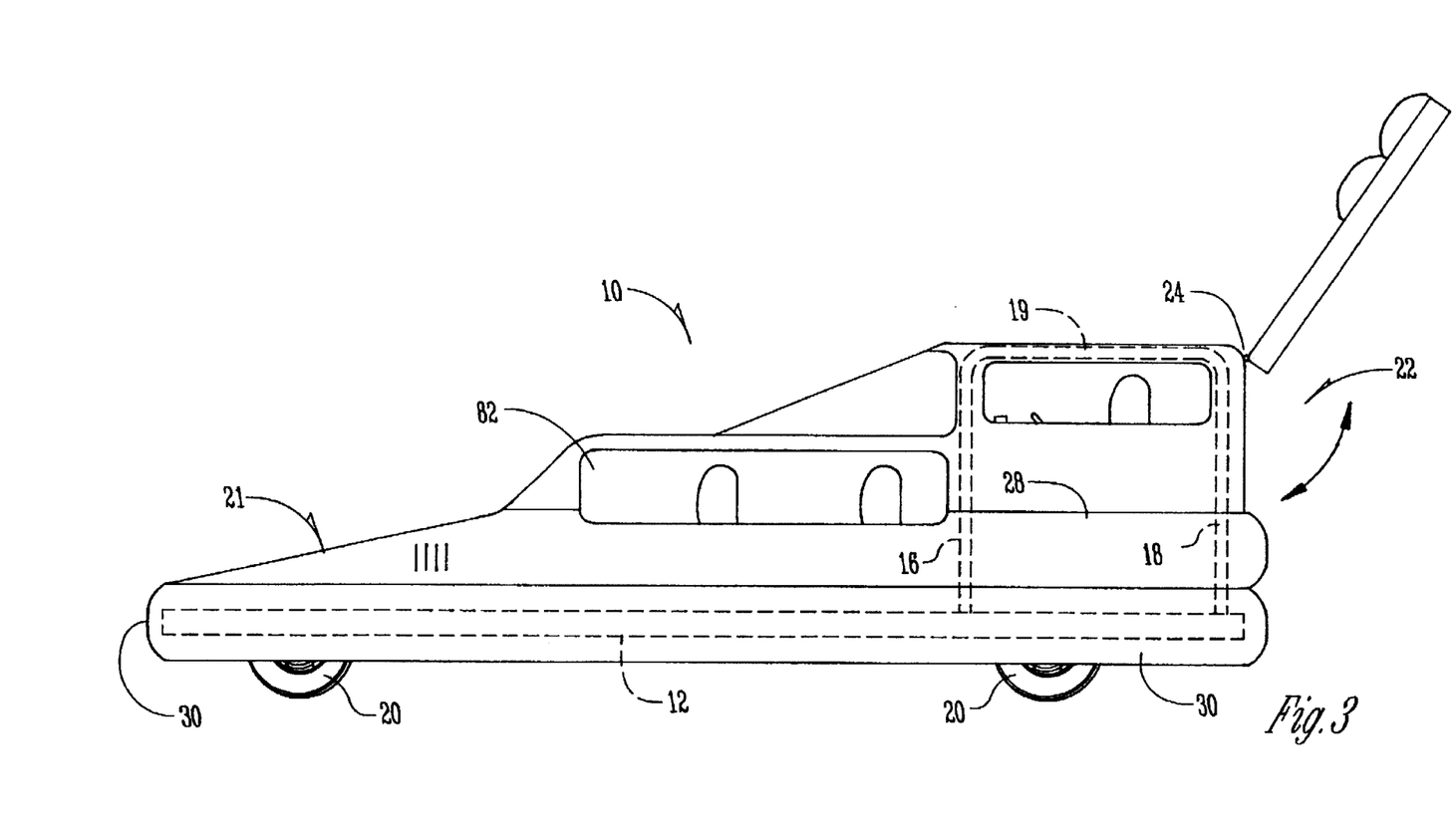
FIG. 3 is a side elevational view thereof.

Referring to the drawings the numeral 10 generally designates a vehicle constructed according to the present invention. Vehicle 10 comprises a vehicle frame 12 (FIG. 3) which has two roll bars 16, 18, rigidly connected thereto and extending upwardly therefrom. A horizontal bar 19 interconnects the roll bars 16, 18. Four wheels 20, are rotatably mounted to the frame 12 in conventional fashion. Mounted to the vehicle frame 12 is a vehicle body 21 having forward and rearward ends. At the rear end is a rear door 22 which is hinged at 24 about its upper edge. Door 22 includes a handle 26 which can latch and unlatch the door in conventional fashion.

Figure 6:
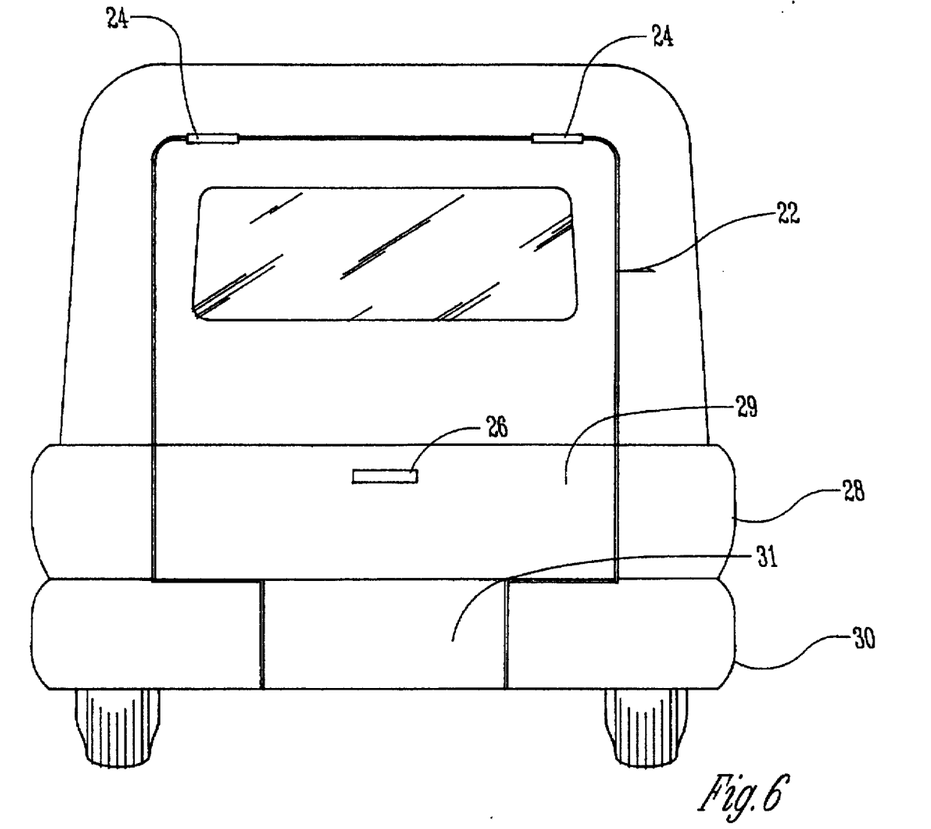

Surrounding the vehicle body 21 is an upper surround bumper 28. Below the upper bumper 28 is a similar lower surround bumper 30. These bumpers each include a hollow core 32 (FIG. 2) which is filled with compressed air and which provides a cushion against collisions from any direction. As can be seen in FIG. 6, the rear door 22 includes a continuation 29 for the upper bumper 28 and also includes a continuation 31 for the lower bumper 30.

Embedded within the front of the lower surround bumper 28 is a wing bumper 34 comprised of steel or some other rigid material. Immediately behind the wing bumper 34 is a collapsible nose 36. Nose 36 is comprised of a crushable material such as plastic foam or other collapsible material 38. Immediately behind the crushable material 38 is a first plate 40, and behind first plate 40 is a first spring section 42 comprised of a plurality of coil springs. Types of springs other than coil springs may be used, but coil springs are the preferred embodiment. Behind the first spring section 42 is a second plate 44 followed by a second spring section 46, a third plate 48 and a third spring section 50. The first, second, and third spring sections 42, 46, and 50 each include progressively larger springs so that the largest spring is in the third section 50.

Spaced rearwardly from the collapsible nose 36 is a first panel 52 which provides an engine compartment 54 therebetween. Within the engine compartment is an engine 60 for powering the vehicle.

A second panel 56 is spaced rearwardly from the first panel 52 and provides a luggage compartment 58 therebetween. Rearwardly of the second panel 56 is a passenger compartment 62 containing a plurality of passenger chairs 64, a lower floor 66 and an elevated floor 68. An inflatable cushion 67 is provided on panel 56 and is adapted to inflate upon collapsing of nose 36. Also, nets 69 are provided in front of each seat 64 to inhibit forward motion of passengers during a collision.

A rear door opening 70 is provided at the rear of the body 21 for entrance and exit from the vehicle. The door opening 70 is covered by door 22 when the door is in its closed position as shown in FIG. 6.

A driver's chair 72 is positioned on the elevated floor 68 and is rearwardly from at least some of the passenger chairs 64. A pair of folding steps 74, 76 are used to provide access to the interior of the elevated floor 68.

Figure 8:
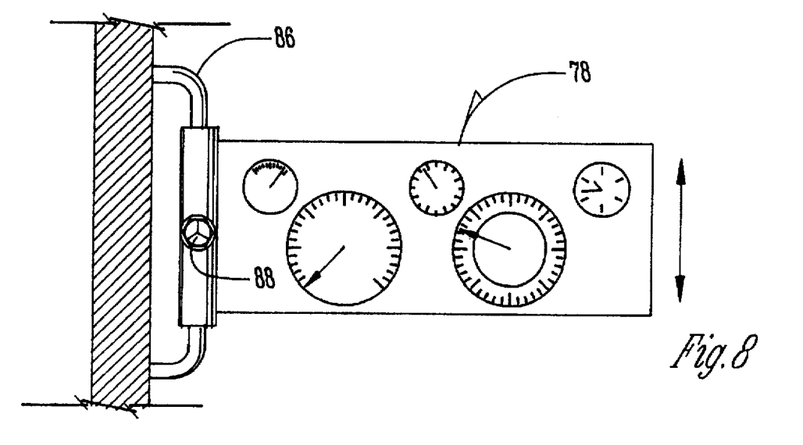

Positioned in front of each of chairs 64, 72 are a control panel 78 and a steering assembly 80. The control panel 78 is constructed in such a manner that it will break away in response to being struck by moving objects during a collision. Also, the control panel is preferably adjustable vertically and at an angle so as to accommodate the proper position for the driver sitting in driver's seat 72. An example of how this is accomplished is shown in FIG. 8. Panel 78 is pivoted about a vertical bar 86 and is also vertically movable on bar 86. Set screw 88 permits adjustment. Other structures permitting tilting, breakaway, and vertical adjustment may be used without detracting from the invention.

Figure 1:
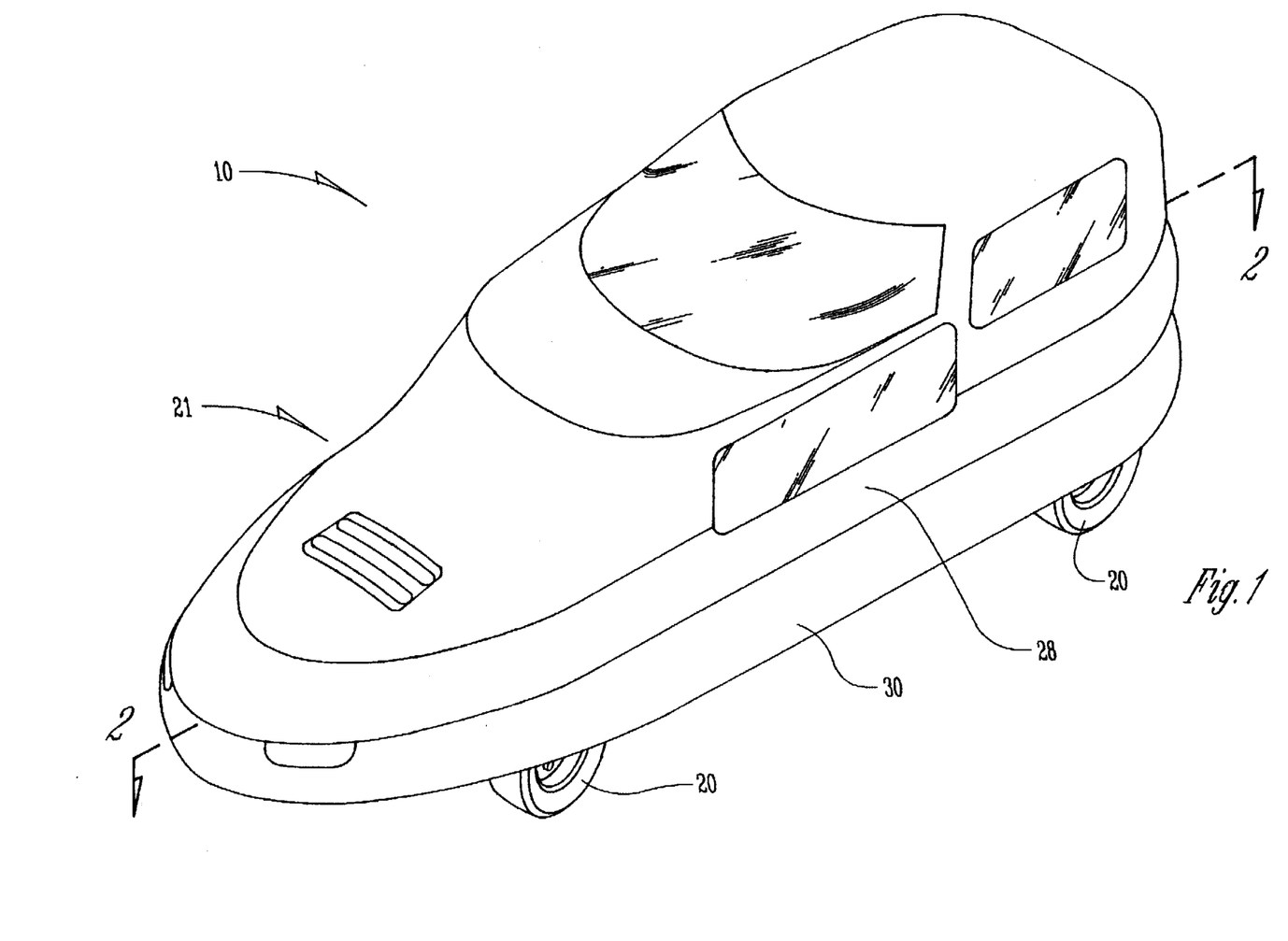
FIG. 1 is a perspective view of the vehicle body construction of the present invention.
Figure 2:
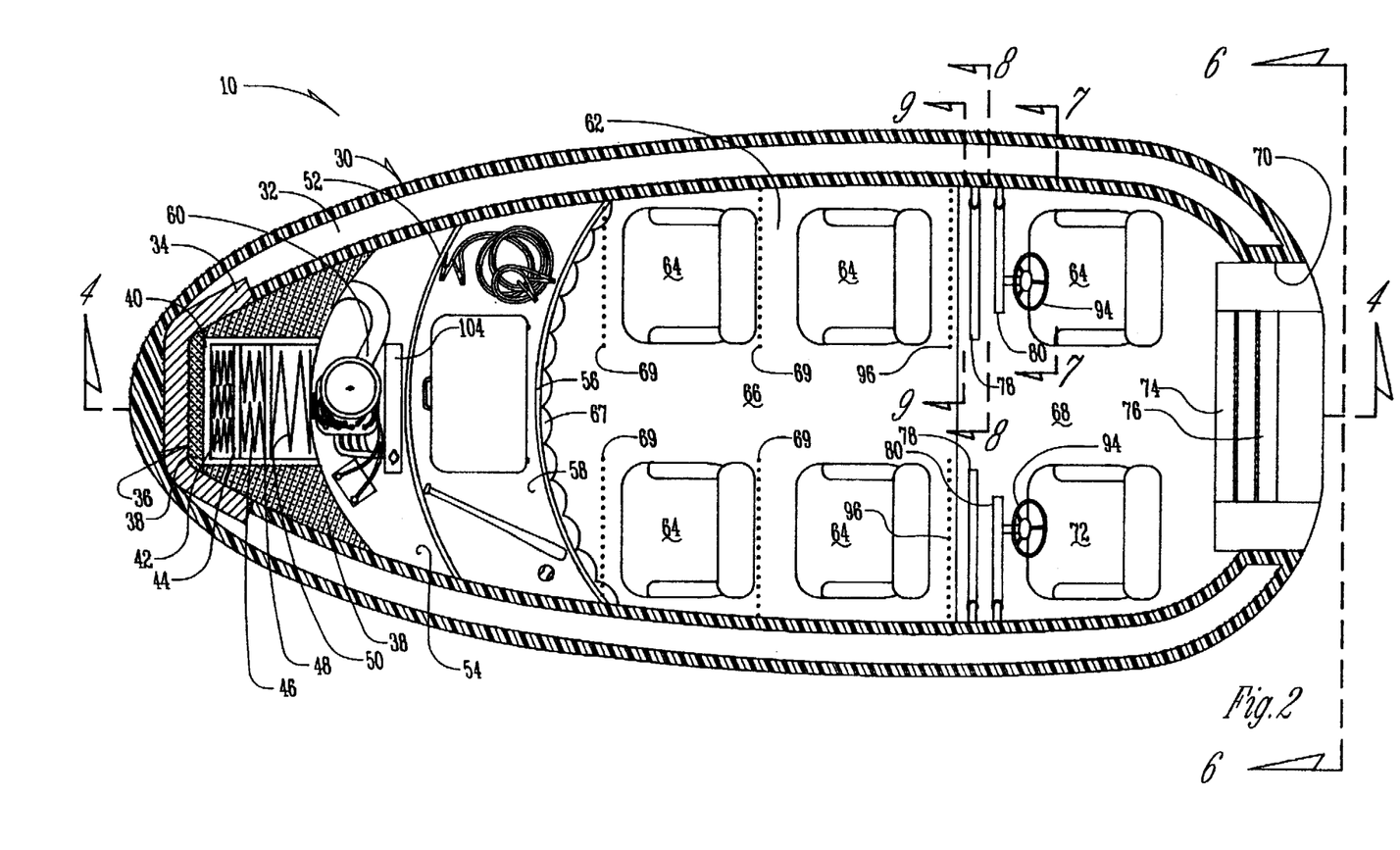
FIG. 2 is a sectional view taken along line 2—2 of FIG. 1.
Figure 4:
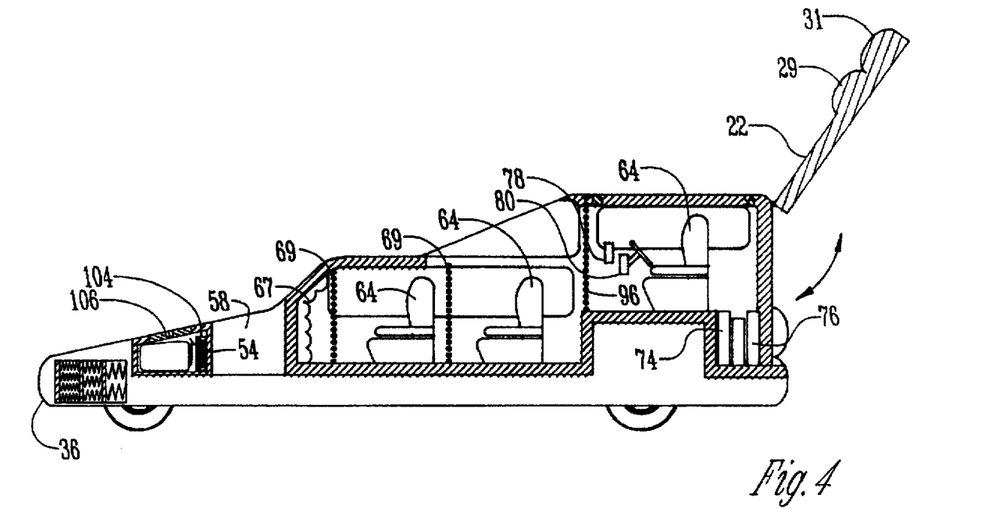
FIG. 4 is a sectional view thereof taken along line 4—4 of FIG. 2.
Figure 5:
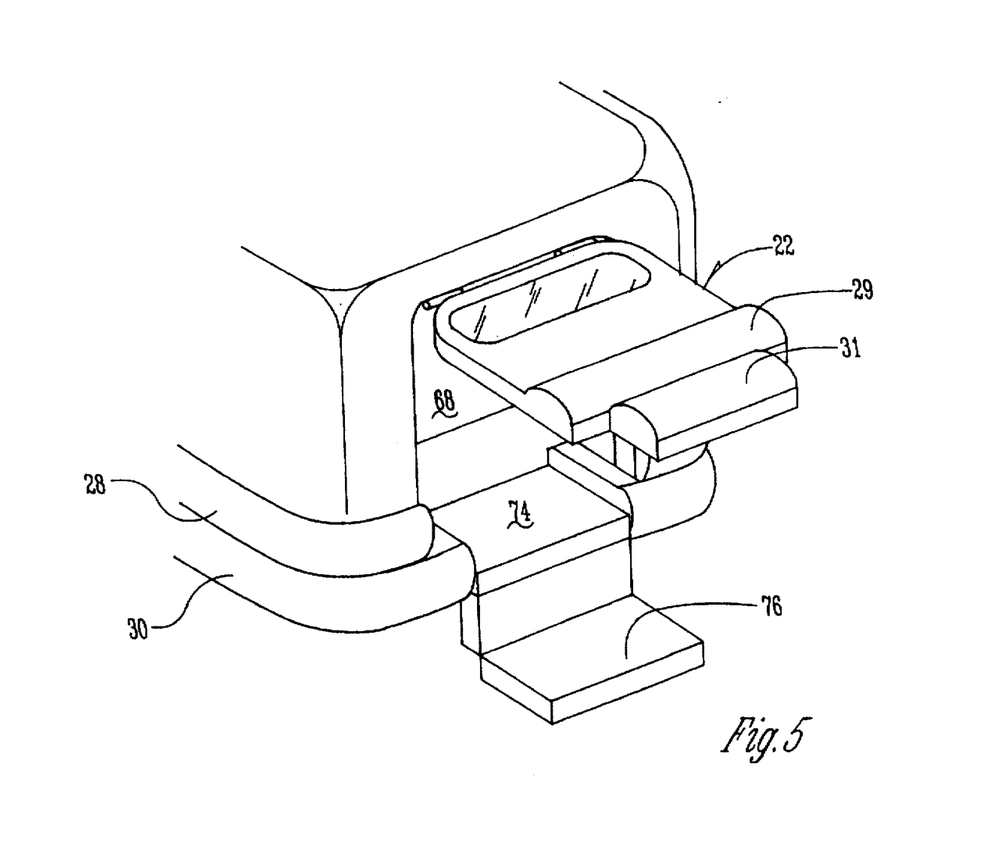
Figure 7:
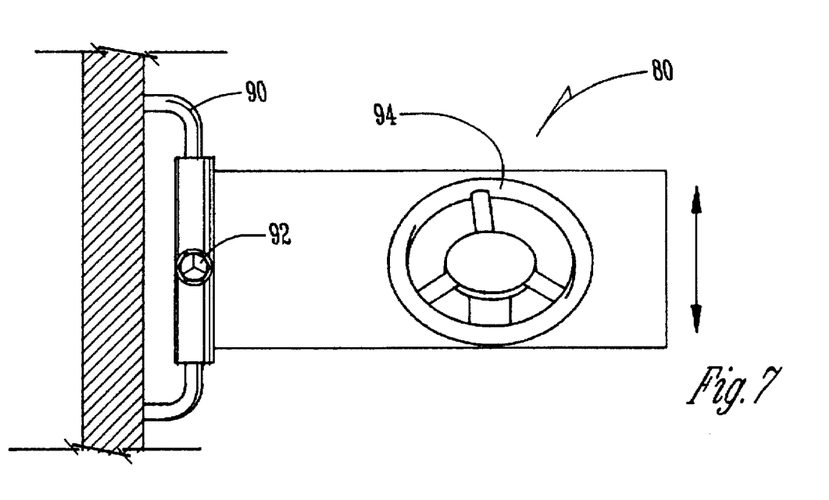
Figure 9:
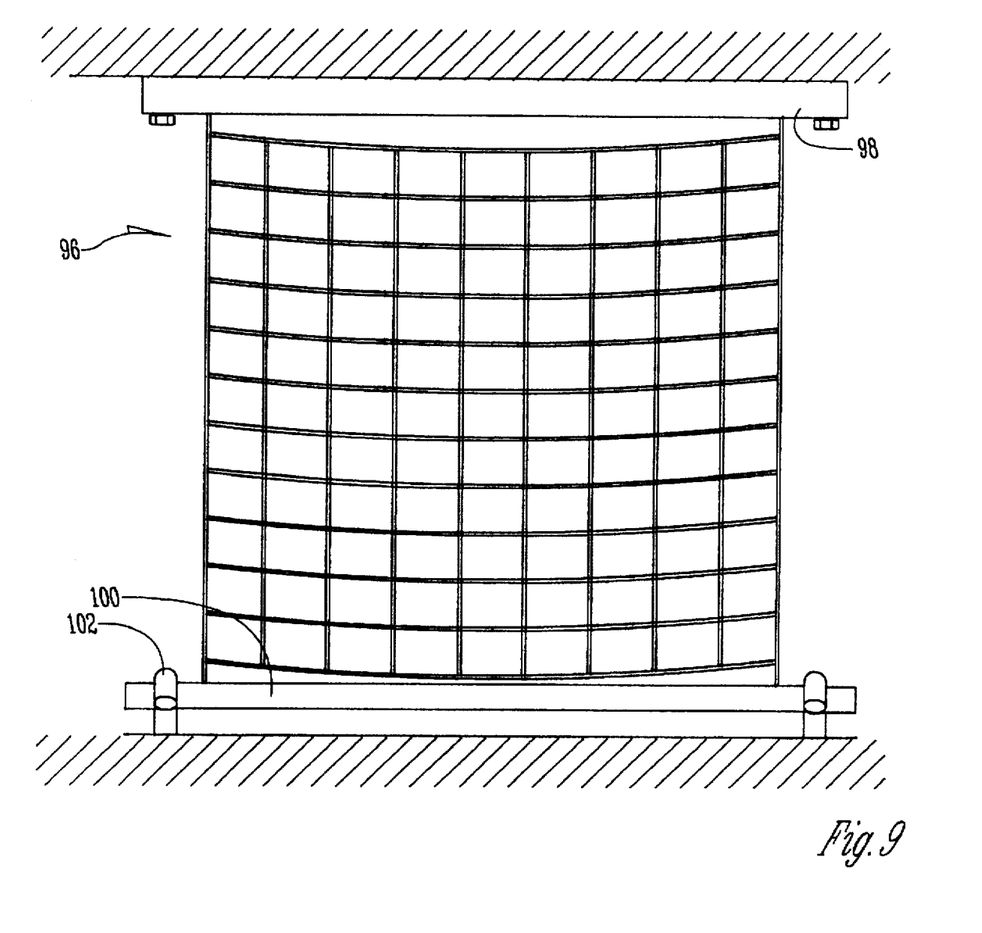

Steering assembly 80 is shown in FIG. 7 and is for example pivoted on a bar 90 with a set screw 92. While a wheel 94 is shown, other types of steering could be used such as a tiller or a joy stick. In front of seats 64, 72 are retractable pull down safety nets 96 (FIGS. 2, 4, and 9). Each net 96 includes an upper housing 98 attached to the roof and a bar 100 which can be pulled down and hooked by hooks 102.

The forward portion of the passenger compartment is provided with lateral gull wing doors 82 (FIG. 3) on its opposite sides. These gull wing doors 82 are hinged adjacent their upper edge (hinge not shown) so that they will pivot upwardly and outwardly and provide means for exiting the vehicle in emergency situations.

Referring to FIGS. 2 and 4, the engine compartment 54 includes a radiator 104 in front of panel 56. Louvers 106 permit cooling air to enter compartment 54 and cool radiator 104.

By placing the driver's seat adjacent the rear of the vehicle, it is possible to provide greater safety for the driver. In the majority of driving situations, there is only the driver in the vehicle, and therefore by placing the driver's seat adjacent the rear of the vehicle it is possible to place the driver further away from the collapsible front end of the vehicle during head on collisions.

Another important advantage of the present invention is the fact that there are three collapsible sections, the collapsible nose 36, the engine compartment 54, and the luggage compartment 50, in front of the passenger compartment. Thus, during a front end collision, these first three sections will collapse before any damage occurs in the passenger compartment. This should maintain the passenger's safety to a greater advantage than presently obtained in present vehicle designs.

The surrounding bumpers 28, 30 protect against collision from all angles, and therefore further add to the safety of the vehicle.

Similarly the roll bars 14, 16, 18 prevent the vehicle from collapsing in the case of a rollover of the vehicle during an accident.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

Figure 10:
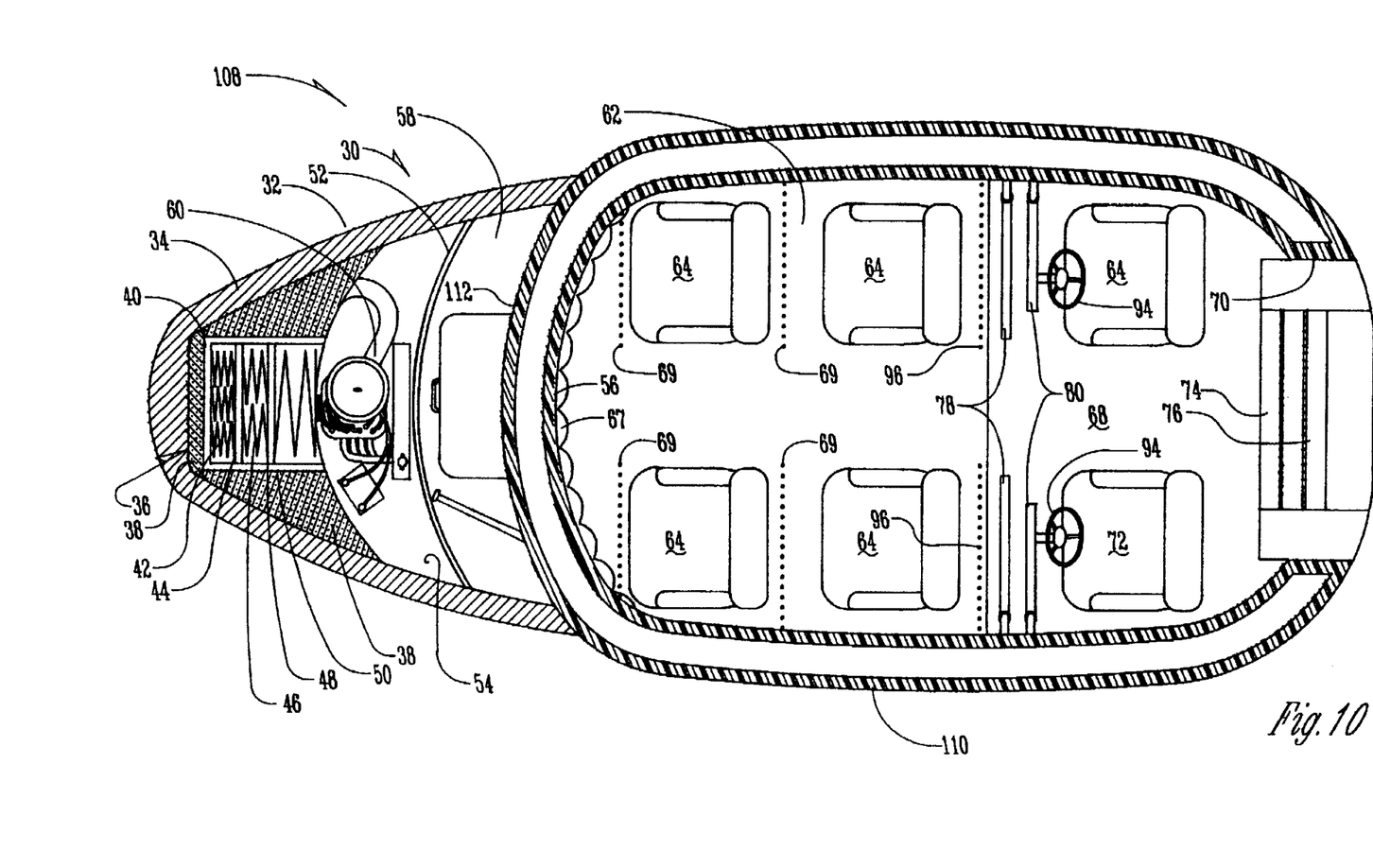

Referring to FIG. 10, a modified form 108 of the invention is shown. Vehicle 108 is identical to vehicle 10 except that vehicle 108 includes a bumper 110 which has a forward portion 112 extending in front of panel 56.

What is claimed is:

1. A vehicle comprising:

an vehicle frame;

an engine mounted on the frame for propelling the vehicle;

a plurality of wheels rotatably mounted on the frame and adapted to support the frame above a supporting surface;

an elongated vehicle body mounted on the frame and having a longitudinal axis, a front end, and a rear end;

a crushable plastic nose extending across the longitudinal axis behind a bumper at the front end of the vehicle and the nose having a hollow therein extending across the longitudinal axis and opening toward the rear end of the body;

a spring mechanism mounted in the hollow in the nose on the longitudinal axis and forwardly adjacent the engine; and a passenger compartment within the vehicle body rearwardly of the crushable nose and the engine;

a control instrument panel slidably and pivotally mounted on a generally vertical bar extending within the passenger compartment; and locking means for fixing the panel with respect to the bar.

2. The vehicle of claim 1 wherein the passenger compartment has two opposite lateral sides and a first control instrument panel is mounted on one lateral side and a second control instrument panel is mounted on the other lateral side such that a horizontal obstructionless gap is provided between the first control instrument panel and the second control instrument panel.

3. The vehicle of claim 1 wherein the locking means is a set screw adapted to adjustably mount the panel to the bar such that the panel pivots about the bar only when a given force is exerted on the panel.

4. A vehicle comprising:

a vehicle frame;

a plurality of wheels rotatably mounted to said frame and adapted to support said frame above a supporting surface;

a vehicle body mounted on said frame and having a longitudinal axis, a front end and a rear end;

said vehicle body containing a first panel spaced rearwardly from said front end to form an engine compartment between said first end and said first panel;

an engine within said engine compartment;

said vehicle body containing a second panel spaced rearwardly from said first panel and forming a luggage compartment therebetween;

said vehicle body having a passenger compartment enclosed therein and a passenger compartment floor forming the bottom of said passenger compartment;

all of said passenger compartment and all of said passenger compartment floor being positioned rearwardly from said second panel and said luggage compartment.

5. A vehicle according to claim 4 wherein said second panel includes a lower end and said passenger compartment includes a forward end, said lower end of said second panel extending downwardly to said forward end of said passenger compartment floor.

6. A vehicle according to claim 5 wherein said vehicle body contains a nose positioned forwardly from said engine compartment and having a rearward and forward nose end, said nose containing a spring positioned between said rearward and forward nose ends, said spring being capable of compression to permit said forward nose end to move toward said rearward nose end in response to an impact at said forward end of said vehicle.

7. A vehicle according to claim 4 wherein said passenger compartment contains a plurality of passenger seats and a driver's seat, at least one of said passenger seats being between said driver seat and said second panel, a control panel and a steering assembly being positioned forward of said driver seat and rearwardly of said at least one passenger seat.

8. A vehicle comprising:

a vehicle frame;

an engine mounted on the frame for propelling the vehicle;

a plurality of wheels rotatably mounted on the frame and adapted to support the frame above a supporting surface;

an elongated vehicle body mounted on the frame and having a longitudinal axis, a front end, and a rear end;

a crushable plastic nose extending across the longitudinal axis behind a bumper at the front end of the vehicle and the nose having a hollow therein extending across the longitudinal axis and opening toward the rear end of the body;

a spring mechanism mounted in the hollow in the nose on the longitudinal axis and forwardly adjacent the engine;

a passenger compartment within the vehicle body rearwardly of the crushable nose and the engine;

wherein the spring mechanism comprises:

a first plate adjacent the nose;

a second plate adjacent the engine spaced rearwardly of the first plate;

an intermediate plate disposed between the first and second plates;

a trio of radially adjacent coil springs each having a central longitudinal axis generally parallel to the longitudinal axis of the vehicle body and being interposed between the first plate and the intermediate plate;

a pair of radially adjacent coil springs each having central longitudinal axis generally parallel to the longitudinal axis of the vehicle body and being interposed between the second plate and the intermediate plate; and a coil spring interposed between the second plate and the engine.

9. The vehicle of claim 8 wherein the spring interposed between the second plate and the engine is stiffer than the other springs.

10. The vehicle of claim 9 wherein the springs interposed between the intermediate plate and the second plate are stiffer than the springs interposed between the first plate and the intermediate plate.

* * * * *